(12) United States Patent
Campbell

(10) Patent No.: US 6,831,247 B2
(45) Date of Patent: Dec. 14, 2004

(54) RESISTANCE BUTT FLASH WELDING

(75) Inventor: James Campbell, Desoto, MO (US)

(73) Assignee: Edge Manufacturing, Inc., Pavely, MO (US)

( * ) Notice: Subject to any disclaimer, the term of this patent is extended or adjusted under 35 U.S.C. 154(b) by 0 days.

(21) Appl. No.: 10/395,553

(22) Filed: Mar. 24, 2003

(65) Prior Publication Data

US 2004/0188392 A1 Sep. 30, 2004

(51) Int. Cl.$^7$ ............................................. B23K 11/04
(52) U.S. Cl. ....................................... 219/97; 219/100
(58) Field of Search .......................... 219/97, 100, 101, 219/104; 310/80

(56) References Cited

U.S. PATENT DOCUMENTS

| | | | |
|---|---|---|---|
| 2,214,856 A | * | 9/1940 | Jahde et al. ................. 219/101 |
| 3,694,613 A | | 9/1972 | Ballard et al. |
| 3,748,431 A | * | 7/1973 | Melbard et al. ............... 219/97 |
| 4,044,219 A | * | 8/1977 | Lebedev et al. ............. 219/100 |
| 4,408,114 A | | 10/1983 | Nakata et al. |
| 4,417,121 A | | 11/1983 | Kuchuk-Yatsenko et al. |
| 4,442,337 A | | 4/1984 | Nakata et al. |
| 4,733,044 A | | 3/1988 | Kuchuk-Yatsenko et al. |
| 4,940,876 A | | 7/1990 | Kuchuk-Yatsenko et al. |
| 5,099,161 A | * | 3/1992 | Wolfbauer, III ............... 310/80 |
| 5,367,138 A | * | 11/1994 | Moss et al. .................. 219/109 |
| 6,011,235 A | | 1/2000 | Mukai et al. |
| 6,070,781 A | | 6/2000 | Johnson et al. |
| 6,169,263 B1 | | 1/2001 | Derby, Jr. et al. |
| 6,180,910 B1 | | 1/2001 | Derby, Jr. |

\* cited by examiner

*Primary Examiner*—Clifford C. Shaw
(74) *Attorney, Agent, or Firm*—Polster Lieder Woodruff & Lucchesi, L.C.

(57) ABSTRACT

A resistance butt flash welding machine comprises two work piece clamping platens, at least one of which is movable with respect to the other, an electric servo motor operatively mechanically connected to the movable platen, and a programmable electrical control connected to the servo motor to control the motor, and programmed to regulate the pattern of timing of changes in motion of the movable platen, to control speed of the motion and to control the upsetting force applied to the movable platen required to forge together work pieces clamped in the platens. The process of use of the machine includes programming the programmable control.

13 Claims, 2 Drawing Sheets

RESISTANCE BUTT FLASH WELDING

CROSS REFERENCE TO RELATED APPLICATIONS

STATEMENT REGARDING FEDERALLY SPONSORED RESEARCH OR DEVELOPMENT

Not Applicable

BACKGROUND OF THE INVENTION

Resistance butt welding and resistance butt flash welding machines are well known in the art. In a resistance butt welding process, two pieces of material, held by clamps, also called platens, are brought into contact with each other. Once the ends are in contact, an electric current is passed through the pieces. The high resistance at the interface between the two pieces causes heat to be generated. The current is passed through until the pieces are hot enough to be forged through a process called upsetting. Once the ends come into contact a constant pressure is applied during the heating process. Motion starts to occur as soon as the metal becomes forgeable.

The process of resistance butt flash welding starts by bringing the ends of the clamped pieces to be welded into contact with each other. A voltage is placed across the pieces as they approach each other. As the pieces touch, the metal heats and is expelled from the contact area. The expulsion, called flashing, is continued at a very precise rate. After flashing for a specified time and distance, a high-force, high-speed move, known as upset, is completed. The optimum amount of force and distance to be moved vary with the nature, thickness and mass of the pieces to be welded. The flashing motion has traditionally been made using a cam, cam follower, and the necessary linkage to attach the cam follower to the movable platens. See for example, U.S. Pat. No. 3,694,613. This method works well for a single flashing (cam) profile. However, when the material to be welded requires different flashing (cam) profiles to weld the work pieces together consistently, changing the flashing (cam) profiles or making an adjustment contained within the cam follower linkage is difficult and time consuming. Other factors in controlling the welding are the timing of changes in the motion, control of speed of the motion, and control of the upsetting force required to forge the work pieces together. The timing changes are generally done with cam switches, which are linked to the flashing cam. These cam switches are difficult to set up accurately and therefore limit the precision of the timing for motion changes.

For a discussion of the two techniques, see Derby et al, U.S. Pat. No. 6,169,263.

The servo system of this invention will work with both processes, but provides more benefit as applied to the resistance butt flash welding process, because of the easy replication of the cam./cam follower motion.

More recently, the energizing force for the welders has been a hydraulic cylinder. The amount of force and speed of movement of the work pieces toward one another has been controlled by the admission to and release from the cylinder of hydraulic fluid, or air, if a pneumatic system is employed. See, for example, U.S. Pat. No. 6,169,263, Derby, Jr. et al, and U.S. Pat. No. 4,940,876, Kuchuk-Yatsenko et al. The hydraulic system is generally more expensive and less accurate than the cam system and than the system of the present invention.

BRIEF SUMMARY OF THE INVENTION

In accordance with this invention, generally stated, in a butt welding system, the timing of changes in the motion, control of speed of the motion, and control of the upsetting force required to forge the work pieces together are controlled and actuated by a computer-controlled or other programmable electronic device-controlled linear motor or, preferably, by a similarly controlled rotary motor servo ballscrew drive. The resultant welds can be tempered at the loading station, or moved to a reheat station apart from the loading station at which the weld is made. The pressure applied to the work pieces during the upsetting process can be controlled by establishing and monitoring current limits for the motor being used, for example, or determining and monitoring the distance to be traversed by one work piece as it approaches the other. The speed of advancing of one of the work pieces with respect to the other can be controlled by establishing a torque-speed chart, moving the pieces to a specific relative position to begin with, and monitoring current draw as the pieces meet. The optimum conditions can easily be established experimentally for any specific machine and particular application. Suitable servo systems are available from Pacific Scientific, Allen Bradley, Siemens or GE Fanuc, ball screw servo systems being commonly used with CNC equipment on machine tools.

BRIEF DESCRIPTION OF THE SEVERAL VIEWS OF THE DRAWINGS

In the drawings.

Corresponding reference characters indicate corresponding parts throughout the several views of the drawings.

DETAILED DESCRIPTION OF INVENTION

Figure 1:
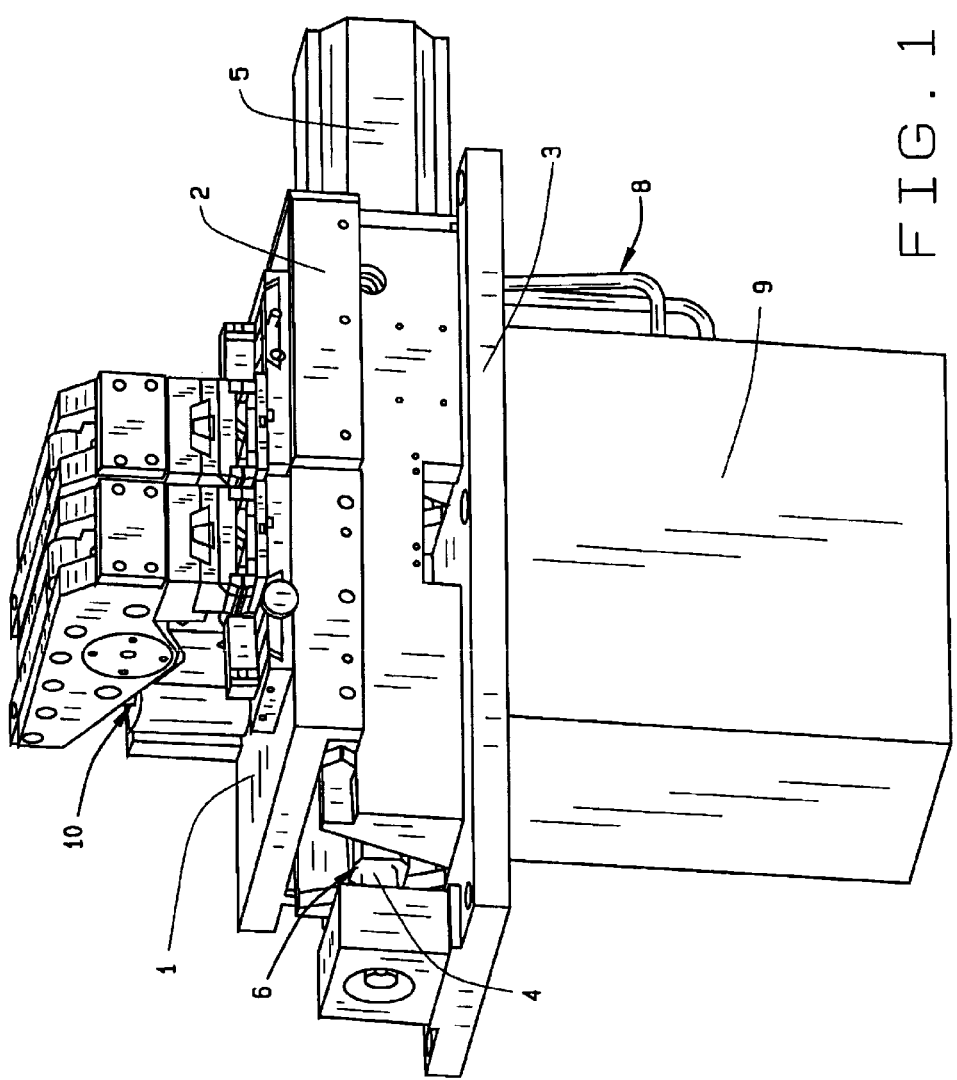
FIG. 1 is a view in perspective of a machine of one embodiment of this invention.
Figure 2:
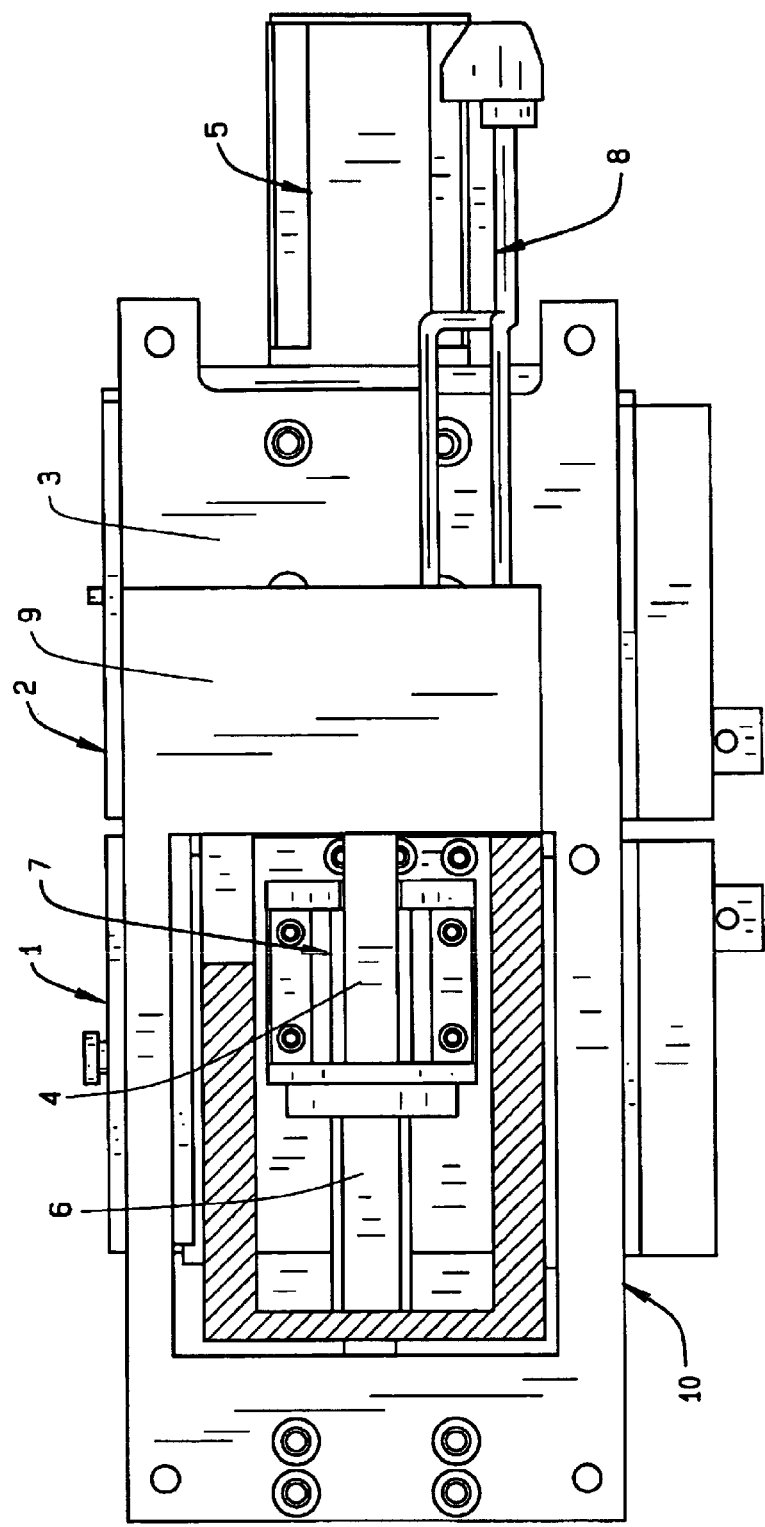
FIG. 2 is a bottom plan view of the machine of FIG. 1.

The following detailed description illustrates the invention by way of example and not by way of limitation. As various changes could be made in the construction and method described without departing from the scope of the invention, it is intended that all matter contained in the above description or shown in the accompanying drawings be interpreted as illustrative and not in a limiting sense.

Referring now to the drawings, reference numeral 10 indicates one illustrative embodiment of a completed machine. The machine 10 includes a movable platen 1, a stationary platen 2, and a clamping frame 3, which are conventional. A ball screw 4, of a type available from Nook, INA, or Thompson, for example, driven by a servo motor 5, is connected to a ball nut 6, which, in turn, is connected to the movable platen 1 by way of ball nut platen linkage 7. A programmable motor control 9 is electrically connected to the servo motor 5 by electric cables 8. The control 9 is programmed to move the movable platen 1 with respect to the stationary platen 2 in the desired patterns of movement, including dwell time, rates of movement, and degrees of force required to produce the optimum obtainable weld. The instructions from the control to the servo motor 5 are of the character of the instructions programmed into the controls for CNC controlled machine tools, which, as far as is known to applicant, have never been applied to a resistance flash butt welding machine, or a resistance butt welding machine. The control 9 is a multi-function one, controlling also the amount of current supplied and the voltage applied across the pieces to be welded during the welding process. See, for example, as applied to spot welding, Nakata et al., U.S. Pat. No. 4,442,337.

As is well known in this art, if the pieces to be welded are moved together too rapidly, not enough heat is generated to forge the pieces properly, and if they are moved too slowly, too much heat is generated, and an excessive amount of material is burnt. The optimum speeds are established experimentally. Similarly, the amount of pressure required is best determined by experiment. This sort of experimentation is expected and is routine in the art. The amount of current drawn by the motor is noted at each stage of the process in determining the optimum conditions, and the control programmed accordingly.

Numerous variations in the apparatus and process of this invention within the scope of the appended claims will occur to those skilled in the art in light of the foregoing disclosure. Merely by way of example, as has been indicated, a linear motor can be used instead of the rotary motor described, eliminating the need for the ball-screw drive. A shaft of the linear motor can be connected directly to the movable platen, or through a linkage. It may be desirable, particularly with the use of a linear motor, to provide a supplemental hydraulic system for use when heavy pieces are being welded, to provide the force needed to ensure a satisfactory weld. The hydraulic system can also be controlled by the computer or other programmable electronic device (control) 9. These variations are merely illustrative.

Having thus described the invention, what is claimed and desired to be secured by Letters Patent is:

1. A resistance butt flash welding machine comprising two work piece clamping platens, at least one of which is movable with respect to the other, an electric servo motor operatively mechanically connected to said movable platen, and a programmable electrical control connected to said servo motor to control said motor, and programmed to regulate the pattern of timing of changes in motion of said platen, and to control speed of the motion throughout the flashing and upset portions of the weld cycle; and to control the upsetting force applied to said movable platen required to forge together work pieces clamped in said platens.

2. The machine of claim 1 wherein the servo motor is a rotary motor driving a ball-screw drive operatively connected to said movable platen.

3. The machine of claim 2 wherein the programmable electrical control is a computer.

4. The machine of claim 1 wherein the electric servo motor is a linear motor with a shaft operatively connected to said movable platen.

5. A resistance butt welding machine comprising two work piece clamping platens, at least one of which is movable with respect to the other, an electric servo motor operatively mechanically connected to said movable platen, and a programmable electrical control connected to said servo motor to control said motor, and programmed to regulate the pattern of timing of changes in motion of said platen, and to control speed of the motion throughout the flashing and upset portions of the weld cycle; and to control the upsetting force applied to said movable platen required to forge together work pieces clamped in said platens.

6. The machine of claim 5 wherein the servo motor is a rotary motor driving a ball-screw drive operatively connected to said movable platen.

7. The machine of claim 5 wherein the programmable electrical control is a computer.

8. The machine of claim 5 wherein the electric servo motor is a linear motor with a shaft operatively connected to said movable platen.

9. A resistance butt welding machine comprising two work piece clamping platens, at least one of which is movable with respect to the other, a ball-screw drive connected to said movable platen, said drive including a rotary motor, and a computer electrically connected to said motor to control said drive and programmed to regulate the timing of motion of said movable platen, and to control the speed of the motion throughout the flashing and upset portions of the weld cycle; and to control the upsetting force applied to said platen required to forge together work pieces clamped in said platens.

10. The process of operating a resistance butt flash welding machine having two work piece clamping platens, at least one of which is movable with respect to the other, and a motor operatively connected to drive said movable platen, comprising providing a programmable control connected to control said motor, and programming said control to regulate the timing of changes in the motion of said movable platen, and to control the speed of said motion throughout the flashing and upset portions of the weld cycle; and to control the upsetting force applied to said platen required to forge together work pieces clamped in said platens.

11. The process of claim 10 wherein optimum conditions for the welding are established experimentally, reflected in current draw of said motor at each stage of the process, and the control means are programmed accordingly.

12. The process of claim 10 wherein said control is operatively connected to a source of power and programmed to regulate the amount of current provided across the work pieces to be welded at each stage of the process during which such current is supplied, and to control the desired dwell time when the pieces are upset.

13. The process of claim 10 wherein optimum conditions of speed of approach of the pieces and the amount of pressure to be applied to the pieces at the weld site for the upsetting step are established experimentally and the control means are programmed accordingly.

* * * * *